(12) United States Patent
Matsutani et al.

(10) Patent No.: US 7,616,809 B2
(45) Date of Patent: Nov. 10, 2009

(54) IMAGE PROCESSING DEVICE

(75) Inventors: Takashi Matsutani, Osaka (JP); Satoru Kubota, Osaka (JP); Nobuhiro Minami, Osaka (JP)

(73) Assignee: MegaChips LSI Solutions Inc., Osaka-shi (JP)

( * ) Notice: Subject to any disclaimer, the term of this patent is extended or adjusted under 35 U.S.C. 154(b) by 643 days.

(21) Appl. No.: 11/462,578

(22) Filed: Aug. 4, 2006

(65) Prior Publication Data
US 2007/0248263 A1 Oct. 25, 2007

(30) Foreign Application Priority Data
Aug. 26, 2005 (JP) .............................. 2005-245971

(51) Int. Cl.
*G06K 9/00* (2006.01)
(52) U.S. Cl. .................. 382/162; 382/297; 382/298
(58) Field of Classification Search ................ 382/162, 382/166, 260, 296, 297, 298
See application file for complete search history.

(56) References Cited

U.S. PATENT DOCUMENTS 7,386,178 B2 * 6/2008 Rai et al. ..................... 382/232
7,512,287 B2 * 3/2009 van Baarsen et al. ........ 382/296

FOREIGN PATENT DOCUMENTS

JP        10-112796        4/1998

* cited by examiner

*Primary Examiner*—Phuoc Tran
(74) *Attorney, Agent, or Firm*—Oblon, Spivak, McClelland, Maier & Neustadt, L.L.P.

(57) ABSTRACT

Color-difference signals that become unnecessary after rotation are deleted from a second pixel while saving color-difference signals that become necessary after rotation in the second pixel, to thereby form image data conforming to YUV422 format. The image data is then rotated, and subsequently the color-difference signals saved in the second pixel are returned to the original first pixel, to thereby form image data conforming to YUV422 format.

6 Claims, 5 Drawing Sheets

FIG. 2

| D2 | | | |
|---|---|---|---|
| Y11 | Y12 | Y13 | Y14 |
| U11 V11 | U12 V12 | U13 V13 | U14 V14 |
| Y21 | Y22 | Y23 | Y24 |
| U21 V21 | U22 V22 | U23 V23 | U24 V24 |
| Y31 | Y32 | Y33 | Y34 |
| U31 V31 | U32 V32 | U33 V33 | U34 V34 |
| Y41 | Y42 | Y43 | Y44 |
| U41 V41 | U42 V42 | U43 V43 | U44 V44 |

FIG. 3

| D3 | | | |
|---|---|---|---|
| Y11 | Y12 | Y13 | Y14 |
| U11 V11 | | U13 V13 | |
| Y21 | Y22 | Y23 | Y24 |
| U12 V12 | | U14 V14 | |
| Y31 | Y32 | Y33 | Y34 |
| U31 V31 | | U33 V33 | |
| Y41 | Y42 | Y43 | Y44 |
| U32 V32 | | U34 V34 | |

F I G . 4

D4a

| Y41 | Y31 | Y21 | Y11 |
|---|---|---|---|
| U32 V32 | U31 V31 | U12 V12 | U11 V11 |
| Y42 | Y32 | Y22 | Y12 |
| Y43 | Y33 | Y23 | Y13 |
| U34 V34 | U33 V33 | U14 V14 | U13 V13 |
| Y44 | Y34 | Y24 | Y14 |

F I G . 5

D4

| Y41 | Y31 | Y21 | Y11 |
|---|---|---|---|
|  | U31 V31 |  | U11 V11 |
| Y42 | Y32 | Y22 | Y12 |
|  | U32 V32 |  | U12 V12 |
| Y43 | Y33 | Y23 | Y13 |
|  | U33 V33 |  | U13 V13 |
| Y44 | Y34 | Y24 | Y14 |
|  | U34 V34 |  | U14 V14 |

F I G . 6

| D100 | | | | |
|---|---|---|---|---|
| | Y11 / U11 V11 | Y12 | Y13 / U13 V13 | Y14 |
| | Y21 / U21 V21 | Y22 | Y23 / U23 V23 | Y24 |
| | Y31 / U31 V31 | Y32 | Y33 / U33 V33 | Y34 |
| | Y41 / U41 V41 | Y42 | Y43 / U43 V43 | Y44 |

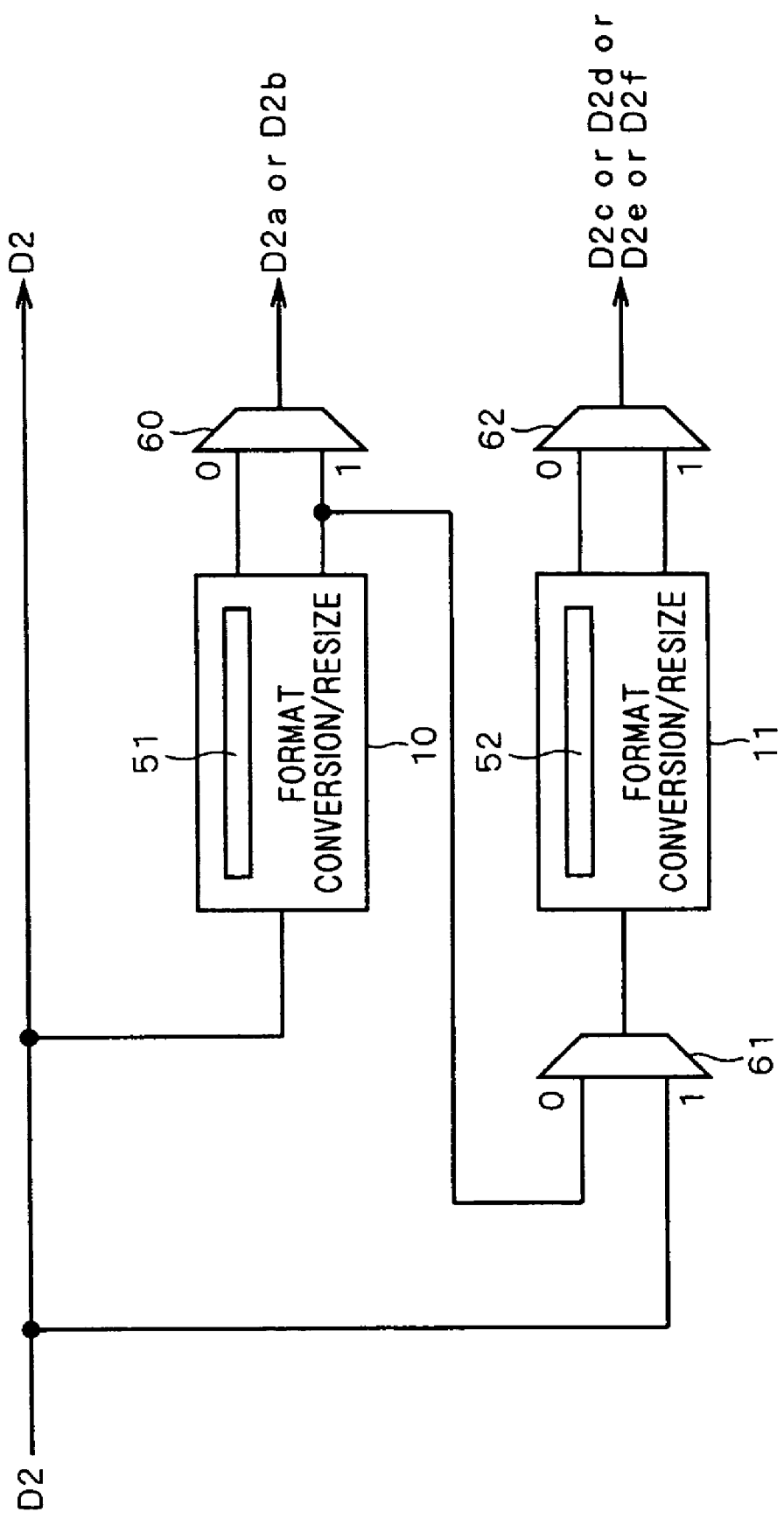

IMAGE PROCESSING DEVICE

BACKGROUND OF THE INVENTION

1. Field of the Invention

This invention relates to image processing devices and, more particularly, to image processing devices that execute image processing including a rotation process on a digital image.

2. Description of the Background Art

An image processing device is disclosed in Japanese Patent Application Laid-Open No. 10-112796 (1998) that includes an image blocking circuit for dividing image data inputted from a scanner and the like into a plurality of blocks, a block rotation circuit for executing a rotation process on the image data in each block (block data), and an image compression processor for executing a JPEG compression process on the block data after the rotation.

However, making no mention at all of the formats of the image data, Japanese Patent Application Laid-Open No. 10-112796 would poorly address format conversion before and after the rotation process if the conversion is desired.

SUMMARY OF THE INVENTION

In a first aspect of this invention, an image processing device executing image processing that includes a rotation process on a digital image includes: a first processing part forming first image data in a first format; a second processing part forming second image data conforming to a second format based on the first image data; and a third processing part rotating the second image data to form third image data conforming to the second format based on the second image data. The first image data includes a first pixel having a first color-difference signal, and a second pixel having a second color-difference signal. The first color-difference signal is a color-difference signal that is necessary for the third image data, but needs to be deleted from the second pixel for the third image data to conform to the second format. The second color-difference signal is a color-difference signal that is unnecessary for the third image data. The second processing part forms the second image data, the second image data being such that the second color-difference signal is deleted from the second pixel, and the first color-difference signal of the first pixel is moved to the second pixel in the first image data. The third processing part forms the third image data, the third image data being such that the second image data is rotated, and the first color-difference signal of the second pixel is moved to the first pixel in the second image data.

In a second aspect of this invention, in the image processing device according to the first aspect, the first format is YUV444 format, and the second format is YUV422 format.

In a third aspect of this invention, the image processing device according to the first or second aspect includes a processing part executing a filtering process by using at least one line memory. The second processing part forms the second image data by using a line memory storing row data of the first image data. The second processing part uses, as a line memory for forming the second image data, the line memory used for executing the filtering process.

In a fourth aspect of this invention, in the image processing device according to the third aspect, the filtering process is a resizing process.

According to the image processing device of the first aspect, the second processing part forms the second image data conforming to the second format by deleting the unnecessary second color-difference signal from the second pixel, and moving the necessary first color-difference signal from the first pixel to the second pixel. In addition, the third processing part forms the third image data conforming to the second format by rotating the second image data, and then returning the first color-difference signal saved in the second pixel to the first pixel.

Therefore, format conversion from the first image data in the first format to the third image data in the second format can be performed while executing an image rotation process.

Further, since the third image data includes the first color-difference signal, no loss in image quality is caused in the third image data after the rotation.

A JPEG compression process is typically executed on image data in YUV422 format in a digital still camera and the like. Therefore, the image processing device according to the second aspect in which the third image data in YUV422 format is obtained from the first image data in YUV444 format can easily be applied to a digital still camera and the like.

According to the image processing device of the third aspect, the line memory for executing a filtering process and the line memory for forming the second image data are combined. This simplifies a device structure and cuts down on costs.

According to the image processing device of the fourth aspect, the line memory for executing a resizing process and the line memory for forming the second image data are combined. Therefore, the second image data can easily be formed without losing the resizing functions. Moreover, the third image data having been resized can be obtained as well.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows image data in YUV444 format outputted from a first processing part;

FIG. 3 shows image data formed by a second processing part;

FIG. 4 shows image data formed by rotating the image data by 90 degrees right-handedly.

FIG. 5 shows image data formed by a third processing part;

FIG. 6 shows image data in which the image data in YUV444 format was simply converted to image data in YUV422 format; and FIG. 7 is a block diagram illustrating the structure of a resize filter that executes a resizing process, included in an image processing device according to a second preferred embodiment of this invention.

DESCRIPTION OF THE PREFERRED EMBODIMENTS

First Preferred Embodiment

Figure 1:
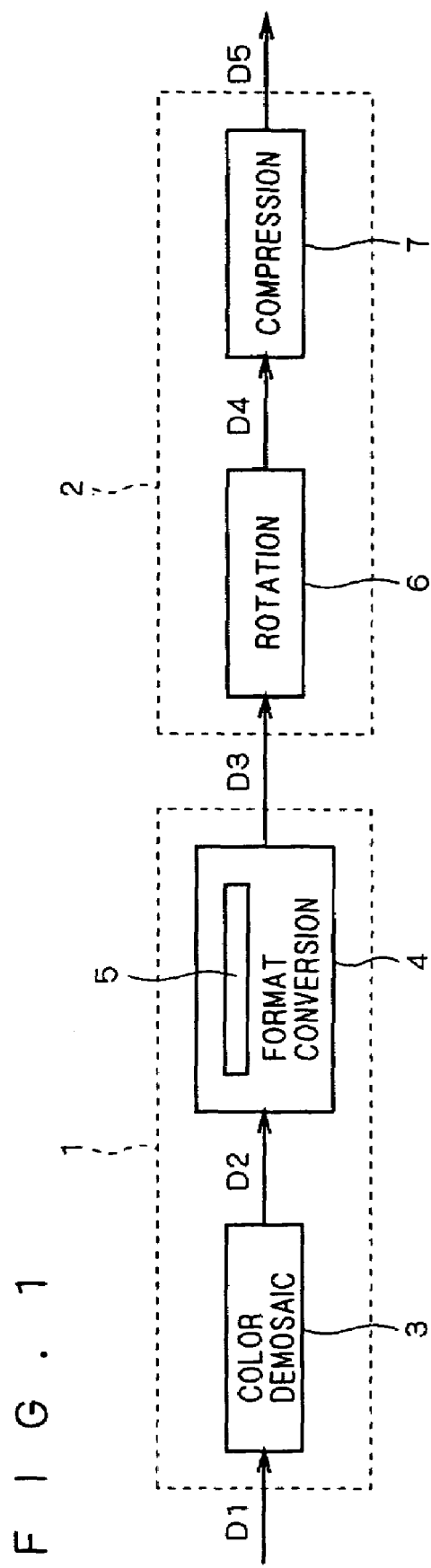
FIG. 1 is a block diagram schematically illustrating the structure of an image processing device according to a first preferred embodiment of this invention.

FIG. 1 is a block diagram schematically illustrating the structure of an image processing device according to a first preferred embodiment of this invention. As shown, this image processing device includes a first processing unit 1, and a second processing unit 2 connected in its subsequent stage.

The first processing unit 1 includes a first processing part 3 and a second processing part 4 connected in its subsequent stage. The first processing part 3 executes a process such as color demosaic on RAW data D1 sent from an imaging device of a digital still camera, to output image data D2 in YUV444 format. The second processing part 4 includes a line memory 5, and performs format conversion on the image data D2 in YUV444 format inputted from the first processing part 3 into image data D3 conforming to YUV422 format, to output the image data D3.

The second processing unit 2 includes a third processing part 6 and a fourth processing part 7 connected in its subsequent stage. The third processing part 6 executes a rotation process (which is right-handed 90-degree rotation by way of example in this embodiment) on the image data D3 inputted from the second processing part 4, and then changes predetermined color-difference signals in the image data after the rotation, to output image data D4 conforming to YUV422 format. The fourth processing part 7 executes a JPEG compression process on the image data D4 inputted from the third processing part 6, to output image data D5 after the compression.

The operation of the image processing device according to the first preferred embodiment will now be described in detail.

FIG. 2 shows the image data D2 in YUV444 format outputted from the first processing part 3. For brevity, FIG. 2 only shows a total of 16 pixels of data, with 4 pixels in a row direction and 4 pixels in a column direction. In YUV444 format, each pixel includes a luminance signal Y and color-difference signals U and V. For instance, a pixel in the first row and first column includes a luminance signal Y11 and color-difference signals U11 and V11.

The first processing part 3 divides the image data D2 into data of each row (row data), to output the divided data sequentially to the second processing part 4 in the subsequent stage. More specifically, the first processing part 3 firstly outputs a data stream including Y11, U11, V11, Y12, U12, V12, . . . Y14, U14, and V14 in this order as row data of the first row in the image data D2, and then outputs a data stream including Y21, U21, V21, Y22, U22, V22, . . . Y24, U24, and V24 in this order as row data of the second row. After that, row data of the third and fourth rows is outputted sequentially in a similar fashion.

The second processing part 4 forms the image data D3 conforming to YUV422 format based on the image data D2 inputted from the first processing part 3. FIG. 3 shows the image data D3 formed by the second processing part 4. In YUV422 format, each pixel in the "n-th" row includes a luminance signal Y and color-difference signals U and V, and each pixel in the "(n+1)th" row includes only a luminance signal Y. For instance, a pixel in the first row and first column includes the luminance signal Y11 and the color-difference signals U11 and V11, and a pixel in the first row and second column includes only the luminance signal Y12.

It should be noted that, as indicated by the dots, the color-difference signals U21 and V21 of a pixel in the second row and first column in the image data D2 shown in FIG. 2 are replaced by the color-difference signals U12 and V12 of a pixel in the first row and second column in the image data D2. Likewise, the color-difference signals U23 and V23 of a pixel in the second row and third column are replaced by the color-difference signals U14 and V14 of a pixel in the first row and fourth column, the color-difference signals U41 and V41 of a pixel in the fourth row and first column are replaced by the color-difference signals U32 and V32 of a pixel in the third row and second column, and the color-difference signals U43 and V43 of a pixel in the fourth row and third column are replaced by the color-difference signals U34 and V34 of a pixel in the third row and fourth column. A method of forming the image data D3 will be described below in detail.

The second processing part 4 deletes the color-difference signals U12, V12, U14 and V14 from the row data of the first row in the image data D2 sent from the first processing part 3, to thereby form row data of the first row in the image data D3.

The second processing part 4 then forms row data of the second row in the image data D3 based on the row data of the second row in the image data D2 sent from the first processing part 3, and the row data of the first row in the image data D2 stored in the line memory 5. More specifically, the second processing part 4 deletes all the color-difference signals U21 to U24 and V21 to V24 in the row data of the second row in the image data D2, and adds the color-difference signals U12 and V12 to the pixel in the second row and first column, and the color-difference signals U14 and V14 to the pixel in the second row and third column, to thereby form the row data of the second row in the image data D3.

Row data of the third row in the image data D3 can be formed by the same method as the row data of the first row, and row data of the fourth row can be formed by the same method as the row data of the second row.

The second processing part 4 divides the image data D3 into row data of each row, to output the divided data sequentially to the third processing part 6 in the subsequent stage. More specifically, the second processing part 4 firstly outputs a data stream including Y11, U11, V11, Y12, Y13, U13, V13 and Y14 in this order as row data of the first row in the image data D3, and then outputs a data stream including Y21, U12, V12, Y22, Y23, U14, V14 and Y24 in this order as row data of the second row. After that, row data of the third and fourth rows is output sequentially in a similar fashion. As such, the row data of each row is outputted as a data stream that complies with YUV422 format.

The third processing part 6 rotates the image data D3 inputted from the second processing part 4 by 90 degrees right-handedly, to form image data D4a shown in FIG. 4. The third processing part 6 then changes predetermined color-difference signals in the image data D4a, to form the image data D4.

FIG. 5 shows the image data D4 formed by the third processing part 6. The color-difference signals U32 and V32 of a pixel in the first row and first column in the image data D4a shown in FIG. 4 have been moved to a pixel in the second row and second column. Likewise, the color-difference signals U12 and V12 of a pixel in the first row and third column have been moved to a pixel in the second row and fourth column, the color-difference signals U34 and V34 of a pixel in the third row and first column have been moved to a pixel in the fourth row and second column, and the color-difference signals U14 and V14 of a pixel in the third row and third column have been moved to a pixel in the fourth row and fourth column. Such rotation and movements of the color-difference signals can be carried out in a local memory used for compression such as JPEG or MPEG.

The third processing part 6 converts an address to be supplied to the above-mentioned local memory as if a pixel in the fourth row and first column in the image data D3 shown in FIG. 3 is a pixel in the first row and first column, to output data read therefrom to the fourth processing part 7 in the subsequent stage. The rotation and movements are carried out on the other data as well by performing the same address conversion, so that the third processing part 6 outputs a data stream that complies with YUV422 format to the fourth processing part 7 in the subsequent stage.

The fourth processing part 7 executes a JPEG compression process on the image data D4 inputted from the third processing part 6, to output the image data D5 after the compression.

Referring to FIGS. 2 and 5, the color-difference signals U12 and V12 of a pixel including the luminance signal Y12 (which is called a "first pixel" for convenience) in the image data D2 shown in FIG. 2, for example, are included in the image data D4 after the rotation shown in FIG. 5. On the other hand, the color-difference signals U21 and V21 of a pixel including the luminance signal Y21 (which is called a "second pixel") in the image data D2 are not included in the image data D4. Namely, in the image data D2 shown in FIG. 2, the color-difference signals U12 and V12 of the first pixel are signals necessary for forming the image data D4, and the color-difference signals U21 and V21 of the second pixel are signals unnecessary for forming the image data D4.

When the image data D2 in YUV444 format is subjected to simple format conversion into image data in YUV422 format, the color-difference signals U12 and V12 of the first pixel do not remain but the color-difference signals U21 and V21 of the second pixel remain in image data D100 after the conversion, as shown in FIG. 6. Accordingly, the color-difference signals U12 and V12 will not remain in the image data D100 even if the image data D100 is rotated.

In the image processing device according to the first preferred embodiment, therefore, the color-difference signals U21 and V21 that become unnecessary after rotation are deleted from the second pixel while saving the color-difference signals U12 and V12 that become necessary after rotation in the second pixel, to thereby form the image data D3 conforming to YUV422 format (see FIG. 3). The image data D3 is then rotated, and subsequently the color-difference signals U12 and V12 saved in the second pixel are returned to the original first pixel, to thereby form the image data D4 conforming to YUV422 format. This allows the color-difference signals U12 and V12 to remain in the image data D4 thus formed, causing no loss in image quality of the image data D4. Further, format conversion from the image data D2 in YUV444 format into the image data D4 in YUV422 format can be performed while executing an image rotation process.

In terms of a tradeoff between image quality and compression rate, a JPEG compression process is typically executed on image data in YUV422 format in a digital still camera and the like. Therefore, the image processing device according to the first preferred embodiment in which the image data D4 in YUV422 format is obtained from the image data D2 in YUV444 format can easily be applied to a digital still camera and the like. It will be understood that the format mentioned above is for example purposes only and that format conversion to YUV411 format, for example, can be performed as well.

Second Preferred Embodiment

The image processing device according to the first preferred embodiment described above includes the processing part 4 specifically for forming the image data D3. Alternatively, the functions of the processing part 4 may be combined with the functions of another processing part that executes various kinds of filtering processes by using a line memory in the image processing device.

FIG. 7 is a block diagram illustrating the structure of a resize filter that executes a resizing process, included in an image processing device according to a second preferred embodiment of this invention. The resize filter includes a processing part 10 having a line memory 51, a processing part 11 having a line memory 52, and selectors 60 to 62.

The processing parts 10 and 11 execute a format conversion process and a resizing process.

Like the second processing part 4 shown in FIG. 1, the processing part 10 is supplied with the image data D2 in YUV444 format from the first processing part 3, to form image data D2a similar to the image data D3 in YUV422 format shown in FIG. 3 based on row data of the "m-th" row in the image data D2 and row data of the "(m−1)th" row stored in the line memory 51. The image data D2a thus formed is inputted to a first input terminal (0) of the selector 60.

The processing part 10 also averages the row data of the "m-th" row in the image data D2 inputted from the first processing part 3 and the row data of the "(m−1)th" row stored in the line memory 51, to thereby form one row's worth of row data from the two ("(m−1)th" and "m-th") rows' worth of row data. This process is performed on all the rows in the image data D2, to form image data D2b having the amount of data resized to half. The image data D2b thus formed is inputted to a second input terminal (1) of the selector 60 and a first input terminal (0) of the selector 61.

The selector 60 outputs the image data D2a or the image data D2b in accordance with a select signal.

The selector 61 has a second input terminal (1) supplied with the image data D2. The selector 61 outputs the image data D2b or the image data D2 in accordance with a select signal.

The processing part 11 executes a format conversion process and a resizing process on the image data inputted from the selector 61 by using the line memory 52 in a similar fashion to the processing part 10. The image data formed by the format conversion process is inputted to a first input terminal (0) of the selector 62, and the image data formed by the resizing process is inputted to a second input terminal (1) of the selector 62. The selector 62 outputs either one of the image data in accordance with a select signal.

When both of the selectors 61 and 62 select their first input terminal (0), the selector 62 outputs image data D2c having been resized by the processing part 10 and subjected to format conversion by the processing part 11.

When the selector 61 selects the first input terminal (0) and the selector 62 selects the second input terminal (1), the selector 62 outputs image data D2d having been resized by the processing part 10 and further resized by the processing part 11.

When the selector 61 selects the second input terminal (1) and the selector 62 selects the first input terminal (0), the selector 62 outputs image data D2e, which is the image data D2 having been subjected to format conversion by the processing part 10.

When both of the selectors 61 and 62 select their second input terminal (1), the selector 62 outputs image data D2f, which is the image data D2 having been resized by the processing part 11.

In such ways, in the image processing device according to the second preferred embodiment, a line memory for executing various kinds of filtering processes and a line memory for executing a format conversion process can be combined. This simplifies a device structure and cuts down on costs.

Further, by combining the line memories 51 and 52 for a resizing process with line memories for format conversion, image data in converted format can easily be formed without losing the resizing functions. Moreover, the image data D2c having been resized as well as subjected to format conversion can be obtained as well.

In a filter circuit including a plurality of line memories (such as a lowpass filter or an edge enhancement filter), one of the plurality of line memories should be combined with a line memory for format conversion.

While the invention has been shown and described in detail, the foregoing description is in all aspects illustrative and not restrictive. It is therefore understood that numerous modifications and variations can be devised without departing from the scope of the invention.

What is claimed is:

1. An image processing device executing image processing that includes a rotation process on a digital image, said image processing device comprising:

a first processing part forming first image data in a first format;

a second processing part forming second image data conforming to a second format based on said first image data; and a third processing part rotating said second image data to form third image data conforming to said second format based on said second image data, wherein said first image data includes a first pixel having a first color-difference signal, and a second pixel having a second color-difference signal, said first color-difference signal is a color-difference signal that is necessary for said third image data, but needs to be deleted from said second pixel for said third image data to conform to said second format, said second color-difference signal is a color-difference signal that is unnecessary for said third image data, said second processing part forms said second image data, said second image data being such that said second color-difference signal is deleted from said second pixel, and said first color-difference signal of said first pixel is moved to said second pixel in said first image data, and said third processing part forms said third image data, said third image data being such that said second image data is rotated, and said first color-difference signal of said second pixel is moved to said first pixel in said second image data.

2. The image processing device according to claim 1, wherein said first format is YUV444 format, and
said second format is YUV422 format.

3. An image processing device executing image processing that includes a rotation process on a digital image, said image processing device comprising:

a first processing part forming first image data in a first format;

a second processing part forming second image data conforming to a second format based on said first image data;

a third processing part rotating said second image data to form third image data conforming to said second format based on said second image data; and a processing part executing a filtering process by using at least one line memory, wherein said first image data includes a first pixel having a first color-difference signal, and a second pixel having a second color-difference signal, said first color-difference signal is a color-difference signal that is necessary for said third image data, but needs to be deleted from said second pixel for said third image data to conform to said second format, said second color-difference signal is a color-difference signal that is unnecessary for said third image data, said second processing part forms said second image data, said second image data being such that said second color-difference signal is deleted from said second pixel, and said first color-difference signal of said first pixel is moved to said second pixel in said first image data, said third processing part forms said third image data, said third image data being such that said second image data is rotated, and said first color-difference signal of said second pixel is moved to said first pixel in said second image data, said second processing part forms said second image data by using a line memory storing row data of said first image data, and said second processing part uses, as a line memory for forming said second image data, said line memory used for executing said filtering process.

4. The image processing device according to claim 3, wherein said first format is YUV444 format, and
said second format is YUV422 format.

5. The image processing device according to claim 3, wherein said filtering process is a resizing process.

6. The image processing device according to claim 4, wherein said filtering process is a resizing process.

* * * * *